(12) United States Patent
Lizardo et al.

(10) Patent No.: US 7,174,670 B2
(45) Date of Patent: Feb. 13, 2007

(54) SALMON EGG CHAIN

(76) Inventors: Roldan Lizardo, 2136 Ahern St., Marysville, CA (US) 95901; Vickie Lizardo, 2136 Ahern St., Marysville, CA (US) 95901

( * ) Notice: Subject to any disclaimer, the term of this patent is extended or adjusted under 35 U.S.C. 154(b) by 0 days.

(21) Appl. No.: 10/817,679

(22) Filed: Apr. 1, 2004

(65) Prior Publication Data

US 2005/0223619 A1 Oct. 13, 2005

(51) Int. Cl.
*A01K 85/00* (2006.01)

(52) U.S. Cl. .................... 43/42.24; 43/42.25

(58) Field of Classification Search ......... 43/42.24, 43/42.25; 33/725, 730; 15/220.4
See application file for complete search history.

(56) References Cited

U.S. PATENT DOCUMENTS

| | | | | |
|---|---|---|---|---|
| 2,257,953 A | * | 10/1941 | Haskell | 87/6 |
| 3,435,552 A | * | 4/1969 | Caldwell | 43/43.15 |
| 3,500,574 A | * | 3/1970 | Putnam | 43/42.25 |
| 4,016,892 A | * | 4/1977 | Chodorow | 132/323 |
| 4,780,981 A | * | 11/1988 | Hayward et al. | 43/44.89 |
| 4,796,372 A | * | 1/1989 | Klein | 43/4 |
| 4,947,476 A | * | 8/1990 | Seaburg | 362/109 |
| 5,540,990 A | * | 7/1996 | Cook | 428/364 |
| 6,148,597 A | * | 11/2000 | Cook | 57/287 |
| 6,286,246 B1 | * | 9/2001 | Rachal et al. | 43/42.25 |
| 2002/0011018 A1 | * | 1/2002 | Healy | 43/42.24 |

* cited by examiner

*Primary Examiner*—Michael J. Carone
*Assistant Examiner*—Bret Hayes
(74) *Attorney, Agent, or Firm*—Affordable Patent Service; Kenneth Paul Campbell

(57) ABSTRACT

This invention is a fishing device that is used in its preferred embodiment to attract fish to an object. The invention comprises an untold number of similar features that are mounted to the structure of a strand. When fastened into a loop, the similar features on the strand in the preferred embodiment attract fish.

4 Claims, 1 Drawing Sheet

SALMON EGG CHAIN

BACKGROUND

This invention relates to fishing. Several kinds of live bait are used to hook fish. In addition, many kinds of manmade luring devices (lures) are commercially available for sport and subsistence fishing. Most of these lures are designed to mimic particular traits of the organisms that constitute the natural diet of fish. Such traits may relate to appearance, odor, visual reflection, or physical behavior. Many lures are designed to simulate two or more of these traits, in combination. There are also additives, such as oils, which are used to provide lures with odors that have been proven to attract fish.

Actual fish eggs (specifically salmon eggs) are part of the natural diet of several kinds of freshwater fish. Fertilized salmon eggs are naturally found in the gravel beds in freshwater streams and rivers, in large groups of several hundred.

Salmon eggs are fertilized by the milt of the male, immediately after being deposited by the female. Because the milt is a dense milky fluid, fertilized eggs often appear under a boundary of cloudy water. It is thought that cloudy water in clear streams indicates the presence of salmon eggs, as well as a temporarily abundant supply of nutrient-rich food for predators.

Thus, it is no surprise that synthetic salmon eggs are widely used in fishing, and successful in attracting many kinds of freshwater fish.

Synthetic salmon eggs are sold commercially, in molded clumps. These synthetic eggs are also available with an oil coating that releases an attractive odor into the water. However, these clumps do not provide the appearance of localized cloudy water. Subsistence fishermen would benefit from salmon egg lures that also provide a proximity of cloudy water.

To mimic the appearance of cloudy water, outfitters produce strands of yarn, or bundles of other fibrous materials, to be sold as lures. These yarn strands contain many fibers, which can be fluffed-out manually. When immersed in water, these fluffed bundles give the water a cloudy appearance. They are sold seperately, and require their own process of being fastened to fishing lines.

The object of this invention is to provide a single lure, which mimics salmon eggs, and which also simulates a cloudy water environment. The benefit is that a single lure, with the attractive quality of several existing lures combined, is much easier to fasten to a fishing line. This increases the yield for subsistence fishermen, and sport fisherman alike.

SUMMARY

In accordance with this invention, the device is a string of continuous material. It comprises a number of repetitive node features that are regularly spaced along its length. These node features are somewhat spherical in shape. Between each node feature is a linking segment of constant cross-section. The device can be used as a whole, or it can be used to supply several useful cut lengths, which perform the same function.

In the preferred embodiment, the device comprises a row of gummy beads, which are evenly spaced. A single length of yarn runs along through each bead, connecting it to others and forming a chain. The yarn is flexible and fibrous. Between nodes, the yarn can be fluffed to create the appearance of cloudy water. The yarn also allows the device to be tied into a loop. Said loop can be securely fastened to a fishing line, to serve as a very effective lure.

The preferred embodiment of this invention is used as fishing bait to attract waterlife to a catching means, such as a hook or a trap. The function of this invention encompasses any applicable use of the device to attract fish. However, the preferred embodiment teaches taking a cut length of the device, tying it into a loop, and securing it to a fish hook.

REFERENCE TO DRAWINGS

Drawing Figures

REFERENCE NUMERALS IN DRAWINGS

10 Bead
20 Strand
30 Chain
40 Needle

DETAILED DESCRIPTION

Figure 1:
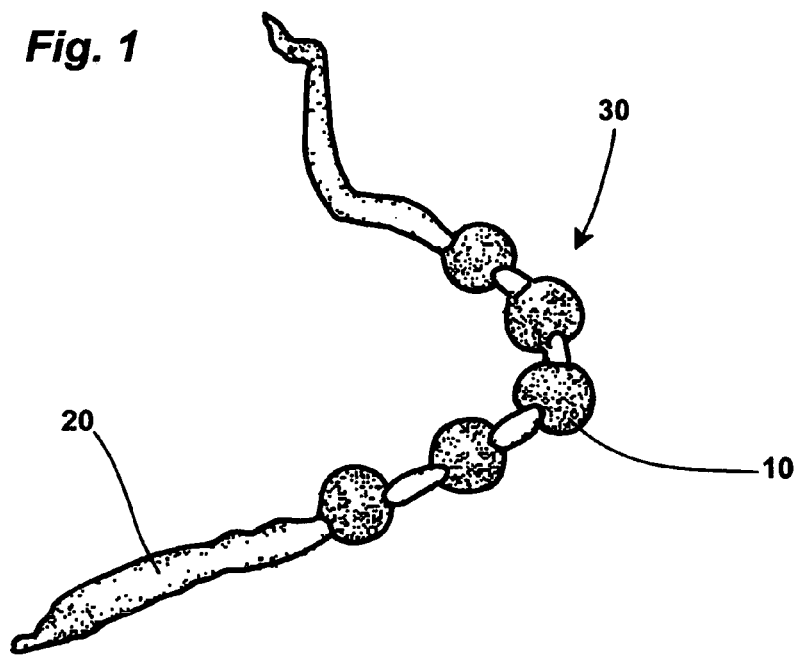
FIG. 1 shows the preferred embodiment of the invention in the open position, in perspective.

The preferred embodiment of the invention is shown in FIG. 1. This embodiment comprises a uniform distribution of beads 10 along a single strand 20 of yarn. The beads remain in a fixed position on the strand, using a suitable fixing means. This embodiment also comprises a length of excess yarn at each end, for making a suitable knot to be used in the formation of a loop.

In this embodiment, said fixing means is friction. Some other suitable fixing means may include the use of adhesives, co-molding processes, and knottings along the strand. Together, the strand and the beads are referred to as a chain 30. The chain can be opened, or it can be closed (as in a loop). The chain may be attached, somewhere along its length, to some other object, by an appropriate fastening means. When the chain is attached to some other object, such as a fishing line, it can perform its intended function.

When used in water, with the intended function of the preferred embodiment, the invention will attract fish. During use, the invention is held underwater at a desired location. While underwater, the invention may be moved, so as to lead fish to another location.

In the preferred embodiment, the beads are molded. The molded material is plastic. The beads can also be of some other material that is suitable for providing friction upon assembly, while said material remains pliable.

In the preferred embodiment, the strand comprises a length of yarn. The strand may also comprise a body of fibrous material that lends itself to automated production, or to material simplicity. The invention may either be comprised of separate elements, or made as a single molded piece of appropriate material. Both of which are contiguous embodiments of the eventual shape.

Figure 2:
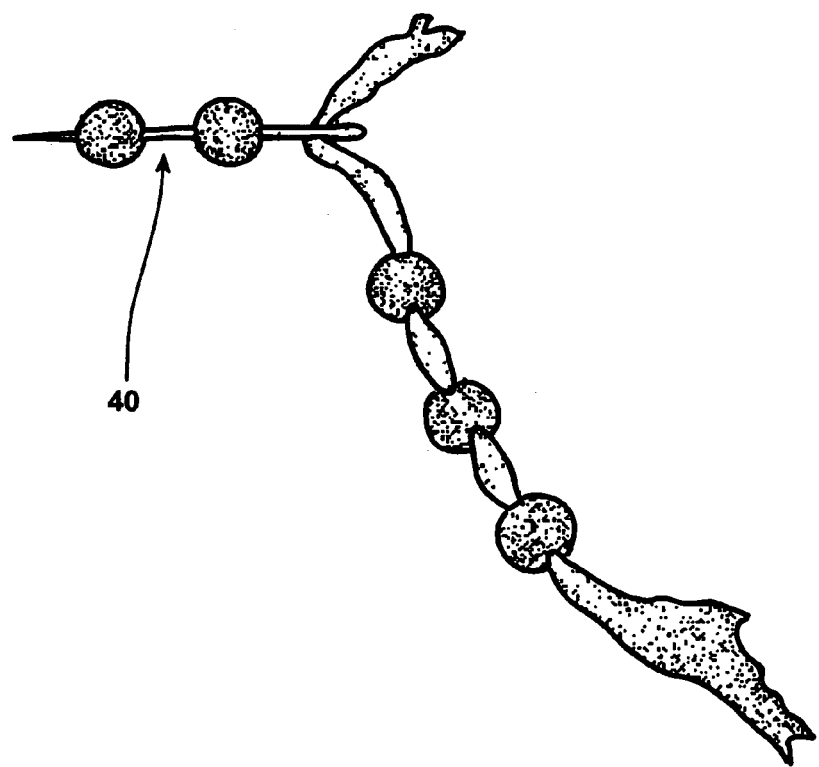
FIG. 2 shows a partial assembly of the preferred embodiment of the invention temporarily containing a needle, in perspective.

FIG. 2 shows a typical chain 30 during manual assembly. A needle 40 has been threaded with a strand of yarn, and used further to thread a plurality of beads.

The invention claimed is:
1. A fishing lure comprising a fibrous strand, and a plurality of beads that are joined to said strand by a fixing means at predetermined intervals, wherein said strand is frayed along its exposed length to create a cloudy appearance while underwater, and wherein said beads are the size, shape and color of typical salmon eggs, such that said lure mimics the appearance of salmon eggs and simulates a cloudy water environment.

2. The lure in claim 1 wherein said fixing means employs a molding process, in such a way that said strand and said beads exist together as a contiguous form of material.

3. A method of manufacturing a fishing lure that comprises the act of fixing a fibrous strand to a plurality of beads at predetermined intervals using a fixing means, wherein said strand is frayed along any portion of its exposed length to create a cloudy appearance while underwater, and wherein said beads are the size, shape and color of typical salmon eggs, such that said lure mimics the appearance of salmon eggs and simulates a cloudy water environment.

4. The manufacturing method in claim 3 wherein said act of fixing said strand to said beads employs a molding process, in such a way that said strand and said beads exist together as a continuous form of material.

* * * * *